April 9, 1940.  T. I. MOSELEY  2,196,667
ELECTRIC TOOTHBRUSH
Filed Dec. 13, 1937
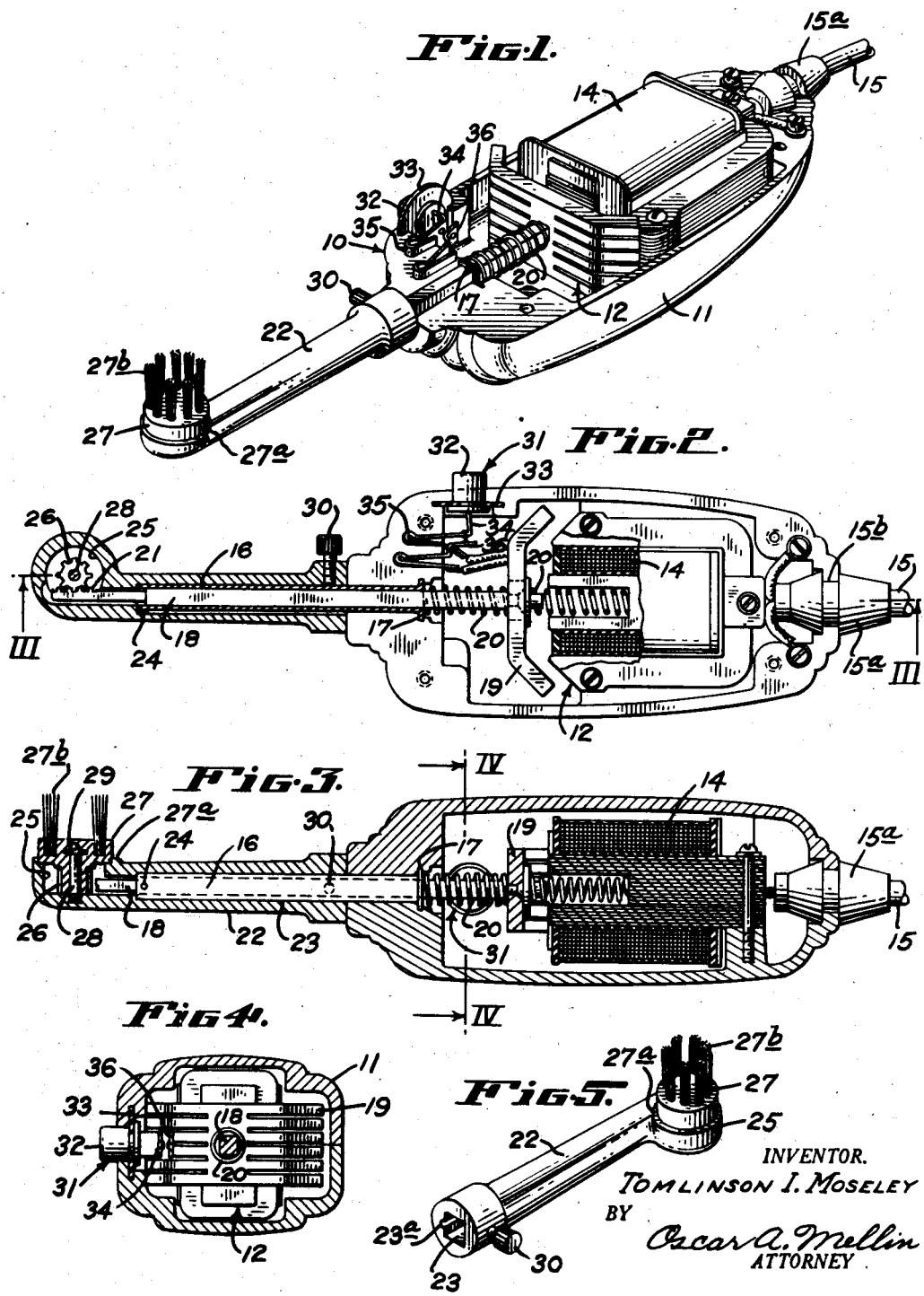
INVENTOR.
TOMLINSON I. MOSELEY
BY Oscar A. Mellin
ATTORNEY.

Patented Apr. 9, 1940

2,196,667

UNITED STATES PATENT OFFICE 2,196,667

ELECTRIC TOOTHBRUSH

Tomlinson I. Moseley, San Francisco, Calif., assignor to Motodent Inc., Los Angeles, Calif., a corporation of California Application December 13, 1937, Serial No. 179,427

4 Claims. (Cl. 15—28)

This invention relates to toothbrushes of the character in which motion is imparted to the brush element by electrically actuated means.

It is the principal object of my present invention to provide a generally improved brushing apparatus having an oscillatory brushing element operated electrically, which apparatus is pleasing in appearance, simple and compact in construction and may be safely employed to efficiently cleanse teeth in the human mouth.

In actual practice I employ an electrical vibratory motor which is entirely enclosed within a moisture-proof casing of molded dielectric material of pleasing external design, and of a shape that it may be readily grasped in the hand of the user. Detachably connected with this casing is a projecting arm carrying an oscillatory brushing element so mechanically connected with the motor that operation of the latter will rapidly oscillate the brushing element. This brushing element is readily replaceable so that it may be replaced as desired.

One form which the invention may assume is exemplified in the following description and illustrated by way of example in the accompanying drawing, in which:

Fig. 1 is a perspective view of my improved toothbrush with one-half of the casing removed showing the internal construction thereof.

Fig. 2 is a plan view of the toothbrush with one-half of the casing removed and with the brush arm in longitudinal section.

Fig. 3 is a longitudinal sectional view taken on line III—III of Fig. 2.

Fig. 4 is a transverse sectional view taken on line IV—IV of Fig. 3.

Fig. 5 is a perspective view of the brush arm.

Referring more particularly to the accompanying drawing, 10 indicates a toothbrush including a hollow casing 11 of dimensions and configuration that it may comfortably be grasped in the hand of the user. The casing 11 is centrally and longitudinally divided into two halves which are counter parts and which are secured together by screws or other suitable means. When joining the halves, moisture-proof sealing material is applied to their abutting faces to insure that the casing will be moisture-proof. The casing 11 is preferably molded of Bakelite or other material having similar advantageous characteristics.

Disposed within the casing and secured therein is an electrical vibratory motor 12, the field winding 14 of which is firmly fastened in one-half of the casing as illustrated in Fig. 2. The current conductors 15 for the motor are led in through one end of the casing in a moisture-proof manner as illustrated. For this purpose a bushing 15a of dielectric material is sealed in an end aperture 15b in the casing.

Projecting from the end of the casing 11, opposite that in which the current conductors 15 are led, is a hollow metallic ferrule 16 which is square in cross section and having a square opening extending longitudinally therethrough. The inner end of this ferrule 16 nests in a square opening molded in the ends of the two casing halves as illustrated. The inner end of the ferrule 16 is provided with a circumscribing flange 17 fitting a groove in the casing halves 11 so as to firmly hold the ferrule 16 against endwise movement.

Reciprocably mounted in the ferrule 16 is a rack 18 likewise square in cross section and snugly, although slidably, fitting the square bore through the ferrule 16. The inner end of the rack 18 projects into the casing 11 and is secured to the armature 19 of the motor 12. The armature 19 is spring balanced by springs 20 for obvious reasons. The outer end of the rack 18 projects from the outer end of the ferrule 16 and is formed with rack teeth 21 on one side. A brush arm 22 is provided which is formed with a square longitudinal bore 23 slidably fitting over the ferrule 16 so that its inner end will abut against the adjacent end of the casing 11. As will be obvious to those skilled in the art, suitable interrupting means, not shown, may be operated by the reciprocating parts to break the field circuit periodically and adapt the device to a current supply of the customary domestic type.

The bore of the ferrule is formed with a keyway 23a adapted to receive a protuberance or key 24 fixed on one side of the ferrule 16 so that the brush arm 22 can only properly fit on the ferrule in one position.

The outer end of the brush arm 22 is formed with a circular hollow socket 25, the center of which is perpendicular to the bore 23 and slightly spaced from one side thereof so that the bore 23 extends substantially tangentially from the socket 25. The toothed end 21 of the rack 18 extends tangentially into the socket 25 to mesh with a pinion 26 formed on a disk-like bristle holder 27 which is rotatably mounted in the socket concentrically thereof. It will be seen that at the outer end of the socket is an annular flange 27a within which the disk-like bristle holder 27 is journalled.

The pinion 26 abuts against the inner end of the socket and the inner face of the disk-like bristle holder 27 abuts against the outer end of the socket. A pintle 28 is provided which is secured at its inner end in the inner end of the socket and projects outwardly to rotatably receive the bristle holder 27, and acts as a shaft therefor. A snap fastener 29 is secured in the bristle holder 27 which snaps over the outer end of the pintle 28 to hold the bristle holder in its proper position relative to the socket 25. It is obvious that by merely exerting an outward pull on the bristle holder 27, that the fastener 29 will release from the pintle 28 so as to enable the bristle holder to be replaced at will.

To secure the brush arm in position on the ferrule 16, I provide a thumb screw 30 which is threaded through the wall of the arm 22 to engage the ferrule 16 and secure the brush arm thereon. By loosening this screw, the brush arm may be moved endwise off of the ferrule and replaced by another arm, if desired. I contemplate providing more than one arm for each body casing, giving the arms different numbers or otherwise identifying them so that for one family merely one body 11 may be provided with a different arm or bristle holder for each member of the family. It is obvious that it is only necessary to slip the arm over the ferrule and tighten the thumb screw to assemble it for use. As the toothed end of the rack engages the pinion 26, the latter will merely revolve into mesh with the rack, and as the arm will only go on the ferrule in proper position, due to the provision of the keyway 23a and the protuberance 24, there is no possibility of improperly assembling the brush arm on the body.

To start the motor I have provided a switch 31 consisting of a button 32 secured to a flexible diaphragm 33 embedded at its periphery in the body 11 and sealed therein so that moisture cannot possibly gain entrance into the body through the button 32. The inner end of the button is associated with a movable switch arm 34 of a normally opened switch 35. The other contact of this switch is that indicated by 36, both the contacts 34 and 36 being resiliently mounted in the body as indicated. It is obvious that by depressing the button inwardly with respect to the body, that a contact will be made between the points on the arms 34 and 36, completing a circuit through the motor, causing the same to commence reciprocating the armature 19. As this latter is spring balanced, it will be very silent and very rapid in operation, and as it reciprocates, it will reciprocate the rack 18 and thereby oscillate the brush holder 27. As this brushing element 27 has bristles 27a projecting from one end thereof, a very effective and desirable brushing action will be obtained on the teeth.

From the foregoing it is obvious that I have provided a very efficient and effective toothbrush which is electrically operated and which is pleasing in appearance, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the character described comprising a hollow body, a guide sleeve projecting outwardly from said body, a vibratory motor mounted in the body, a reciprocable member extending through said sleeve and guided for straight line reciprocation therein and into one end of the body, said member being operatively associated with the motor in such manner that operation of the motor will reciprocate said member, a hollow brush arm adapted to be slipped over said sleeve and the outer end of said reciprocable member to enclose the same and be detachably secured to said sleeve, a brush element rotatably mounted on its own axis at the outer end of said arm, a pinion secured to said brush element, a rack connected with said reciprocable member in mesh with said pinion whereby reciprocation of said member will oscillate said brush element.

2. A device of the character described comprising a hollow body, a motor mounted in the body, a hollow ferrule secured at its inner end in one end of the body and projecting outwardly therefrom, a reciprocable member extending through said ferrule and guided for straight line reciprocation therein, the inner end of said member being operatively associated with said motor in such manner that operation of the latter will reciprocate said member, a hollow brush arm adapted to be fitted over the end of said member and said ferrule and detachably connected with the latter, a rotatable brush element carried by the outer end of the arm, a pinion secured to said brush element, a rack secured to said reciprocable member in mesh with said pinion within the arm whereby reciprocation of said member will oscillate said brush element.

3. A device of the character described comprising a hollow body, a guide sleeve projecting outwardly from said body, a vibratory motor mounted in the body, said motor including an armature, a reciprocable member extending through said sleeve and guided for straight line reciprocation therein and into one end of the body, said member being connected with the armature in such manner that operation of the motor will reciprocate said member, a hollow arm enclosing the outer end of said member and detachably connected with said sleeve, a rotatable brush element mounted at the outer end of the arm, a pinion relatively fixed to said brush element, a rack connected with said member in mesh with said pinion whereby reciprocation of the member will be accompanied by oscillation of the brush element.

4. A device of the character described comprising a hollow body, a vibratory motor mounted in the body, said motor including an armature, a square ferrule secured at its inner end within one end of the body and projecting outwardly therefrom, a square reciprocable member extending through said ferrule and guided for straight line reciprocation therein and extending into the body and connected with said armature, a hollow arm removably fitting over the outer end of said member and said ferrule, means for detachably connecting said arm to said ferrule, a rotary brush element detachably secured to the outer end of the arm, a pinion relatively fixed to said element, a rack formed as a part of said reciprocable member and in mesh with said pinion whereby reciprocation of said member will be accompanied by oscillation of said rotatable brushing element.

TOMLINSON I. MOSELEY.